3,804,796
METHOD OF INCORPORATING VOLATILE ORGANIC SUBSTANCES INTO THERMOPLASTIC MATERIALS AND ARTICLES MADE FROM THE RESULTING COMPOSITIONS
Pierre Alexandre, Paris France, assignor to L'Oreal, Paris, France
No Drawing. Filed June 7, 1972, Ser. No. 260,510
Claims priority, application Luxembourg, June 14, 1971, 63,328
Int. Cl. C08f 45/04
U.S. Cl. 260—42.43      7 Claims

ABSTRACT OF THE DISCLOSURE

Small glass microballs, finely divided diatomite, and an odoriferous organic substance are mixed into a powdered thermoplastic material which is then molded into an article at a temperature 20°–50° C. lower than that ordinarily required to mold articles of said thermoplastic materials.

SUMMARY OF THE INVENTION

Attempts have heretofore been made to incorporate volatile organic products into thermoplastic materials such as polyethylenes and polyvinylchlorides. In particular, odoriferous products adapted to impart to the plastic material either a perfumed odor or a particular odor, such as that of leather, have been so incorporated. In the processes heretofore used one of the two following obstacles has generally been encountered: In the first place, the temperature at which the plastic materials are formed is so high that it causes a certain degradation of the odoriferous products incorporated into the material. In the second place, the volatile odoriferous products have a tendency to evaporate too rapidly after formation of the plastic material so that the plastic material has practically no odor after a very short time.

It has already been suggested, in French Pat. No. 1,558,- excellent retention of the volatile products to be incorporated into the plastic material in addition to the volatile products which are to be added thereto. This technique makes it possible to cause the silica particles to absorb the volatile products which are thus retained in the plastic material for a substantial period of time, but it nevertheless has the disadvantage of requiring, for the formation of the plastic material containing the silica particles, the use of a temperature high enough to cause degradation of the volatile products absorbed or adsorbed by the silica particles, in most cases.

It is the purpose of the present invention to overcome the aforesaid disadvantage by permitting, on the one hand, excellent retention of the volatile products to be incorporated in the plastic material and, on the other hand, avoiding degradation of these volatile products when the plastic material is formed.

It is accordingly the object of the present invention to provide a new method of manufacturing articles consisting of a thermoplastic material containing volatile products which are retained for a substantial period of time within said plastic material, which method is characterized by the step of mixing into the thermoplastic material, between 20% and 30% by weight of the plastic material of microballs of a hard material having a diameter between 40 microns and 70 microns, between 20% and 30% by weight of the starting plastic material of a finely divided diatomite, and, finally, between 1.5% and 3% by weight of the diatomite of at least one volatile product which is to be retained in the plastic material. These materials are homogenously mixed and shaped by extrusion or injection, for example, of the resulting thermoplastic mixture, while bringing this composition to a temperature from 20° to 50° C. lower than the temperature ordinarily used for molding the thermoplastic material in question.

In a preferred embodiment of the invention, the microballs incorporated into the thermoplastic composition are made of glass. These microballs have a narrow granulometric range. That is to say, the distribution of the diameters of the microballs about the average diameter of the group of microballs is within a narrow range.

It has been found that the smaller the range of the diameters of the microballs about the average diameter thereof, the lower the temperature at which the thermoplastic composition according to the invention can be molded will be.

It has also been found that the incorporation of finely divided diatomite makes it possible to obtain a highly satisfactory retention of the volatile products incorporated the thermoplastic composition, which retention is clearly better than that obtained with the processes heretofore known. Moreover, the cost of the diatomite is very low and its specific weight, about 250 g. per liter, permits compensation for the substantial specific weight of the microballs so that the specific weight of the resulting thermoplastic composition approximates the specific weight of the basic thermoplastic material.

The process according to the invention is particularly useful when it is desired to incorporate perfumes into a plastic material. This is particularly the case when it is desired to incorporate odors of the flower type into polyethylenes or when it is desired to incorporate odors of the leather type into polyvinylchlorides.

It should be emphasized that, when perfumes are to be incorporated, in order to avoid degradation of the odoriferous essences it has heretofore been essential to incorporate plastifiers into the mixture which would permit a lowering of the molding temperature of the thermoplastic composition. Unfortunately, these plastifiers would frequently react with the odoriferous essences so that this process resulted, in general, in degradation of the volatile products incorporated into the plastic material.

The present invention is also directed to the new article of manufacture consisting of a thermoplastic composition containing at least one volatile product, such for example as perfume, characterized by the fact that it contains firstly a thermoplastic material, secondly from 20 to 30% by weight of the thermoplastic material of microballs consisting of a hard material having a diameter between 40 and 70 microns, thirdly between 20 and 30% by weight of the plastic material of a finely divided diatomite, and fourthly between 1.5% and 3% by weight of the diatomite of a volatile product, such as a perfume.

In a preferred embodiment of the invention, the microballs are made of glass, the range of the diameters of the microballs with respect to the average diameter is small, and the thermoplastic base material is polyethylene, a polypropylene, a polystyrene, or a polyvinylchloride. In order that the invention may be better understood, a preferred embodiment thereof will now be described, purely by way of illustration and example.

25% by weight of glass microballs having an average diameter of 50 microns is introduced into a high density polyethylene having a molecular weight of about 20,000 and a softening point of about 102° C. An examination of the granulometry of the microballs gives the following results.

| Mesh diameter of screen in microns: | Percentage of microballs passing through the screen |
|---|---|
| 37.5 | 10 |
| 44 | 17 |
| 53 | 21.5 |
| 62 | 41 |
| 74 | 10.5 |

To this composition is added 25% by weight of a finely divided diatomite and 2% by weight of the diatomite of an essential oil known under the name "lemon oil" and described in "The Essential Oils" by E. Guenther, vol. 3, pp. 103–107. A substantially homogenous mixture of the various constituents of the composition in the solid pulverulent state is produced, it being understood that the perfume is added before the diatomite.

This thermoplastic composition is introduced in pulverulent form into an injection molding machine provided with a nozzle having an opening of 0.8 mm. in diameter communicating with the injection mold. The interior of the injection machine cylinder is maintained at a temperature of about 130° C.

The molded thermoplastic material obtained has an agreeable perfumed odor and retains this odor for several months. The same result can be obtained when the lemon oil of the example is replaced by another perfume or essential oil. For example, it can advantageously be used a "lavender oil" as described in "The Essential Oils" by E. Guenther, vol. 3, pp. 463–466, or a "pine oil" as described in "The Essential Oils," by E. Guenther, vol. 6, pp. 227–228. The same result is also obtained with a mixture of different essentials oils and with synthetic perfumes, for example the perfume known under the trade name "Bouquet Fruité" supplied by the firm U.O.P. Fragances.

It will of course be understood that the embodiments hereinbefore described are given purely by way of illustration and example, and may be modified as to detail without thereby departing from the basic principles of the invention.

What is claimed is:

1. Method of producing articles comprising a thermoplastic material and a volatile odoriferous substance, which method comprises the steps of
   introducing into said thermoplastic material
   (1) a quantity of glass microballs having a weight equal to between 20% and 30% of that of said thermoplastic material, said microballs consisting essentially of balls having a diameter between 37.5 and 74 microns, said balls having an average diameter between 40 and 70 microns,
   (2) a quantity of finely divided diatomite having a weight equal to between 20% and 30% of that of said thermoplastic material, and
   (3) a quantity of volatile odoriferous substance having a weight equal to between 1.5% and 3% of that of said diatomite, which odoriferous substance is to be retained within the plastic material,
   homogeneously mixing said materials, and
   shaping the resulting composition into an article while heating said composition to a temperature from 20° to 50° C. lower than the temperature ordinarily used to form articles from said thermoplastic material.

2. Method as claimed in claim 1 in which the microballs incorporated into the thermoplastic composition are made of glass.

3. Method as claimed in claim 2 in which the range of the diameters of the microballs about the average diameter of the group of microballs is small.

4. Thermoplstic composition comprising
   (a) a thermoplastic material,
   (b) a quantity of glass microballs having a weight equal to between 20 and 30% of said thermoplastic material, said microballs consisting essentially of balls having a diameter between 37.5 and 74 microns, said balls having an average diameter between 40 and 70 microns,
   (c) a quantity of finely divided diatomite having a weight equal to between 20% and 30% of that of said thermoplastic material, and
   (d) a quantity of a volatile odoriferous substance having a weight equal to between 1.5% and 3% of that of said diatomite.

5. Composition as claimed in claim 4 in which the microballs are made of glass.

6. Composition as claimed in claim 5 in which the range of the diameters of the microballs about the average diameter is small.

7. Composition as claimed in claim 4 in which the thermoplastic material is selected from the group consisting of polyethylene, polypropylene, polystyrene and polyvinylchloride.

References Cited

UNITED STATES PATENTS 3,661,838  5/1972  Enomoto _____ 260—41 A

OTHER REFERENCES

Modern Plastics Encyclopedia, 1968, September 1967, vol. 45, No. 1A, p. 582.

Modern Plastics Encyclopedia, 1970–1971, October 1970, vol. 47, No. 1A, p. 340.

The Condensed Chemical Dictionary, 6th ed., Reinhold Pub. Corp., New York, 1961, pp. 353 and 354.

ALLAN LIEBERMAN, Primary Examiner

J. H. DERRINGTON, Assistant Examiner

U.S. Cl. X.R.

252—522; 260—37 R, 42.49; 264—331